United States Patent
Rothuizen et al.

(10) Patent No.: US 10,783,920 B2
(45) Date of Patent: *Sep. 22, 2020

(54) TAPE DRIVE WITH GAS JET IMPINGING ON TAPE

(71) Applicant: International Business Machines Corporation, Armonk, NY (US)

(72) Inventors: Hugo E. Rothuizen, Oberrieden (CH); Peter Reininger, Adliswil (CH); Walter Haeberle, Waedenswil (CH); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,607

(22) Filed: Oct. 4, 2019

(65) Prior Publication Data

US 2020/0058324 A1 Feb. 20, 2020

Related U.S. Application Data

(63) Continuation of application No. 16/105,418, filed on Aug. 20, 2018, now Pat. No. 10,522,182.

(51) Int. Cl.
*G11B 15/38* (2006.01)
*G11B 5/008* (2006.01)
(Continued)

(52) U.S. Cl.
CPC .......... *G11B 15/38* (2013.01); *G11B 5/00813* (2013.01); *G11B 15/62* (2013.01); *G11B 15/64* (2013.01)

(58) Field of Classification Search
None
See application file for complete search history.

(56) References Cited

U.S. PATENT DOCUMENTS 3,219,990 A 11/1965 Goehle
3,418,434 A 12/1968 Groenewegen
(Continued)

FOREIGN PATENT DOCUMENTS

DE 3412058 A1 10/1985
JP 52-45310 4/1977
(Continued)

OTHER PUBLICATIONS

"Pneumatic Drum," May 1961, BM Technical Disclosure Bulletin, vol. No. 3, Iss. No. 12, p. 6. (Year: 1961).*
(Continued)

*Primary Examiner* — William J Klimowicz
(74) *Attorney, Agent, or Firm* — Scully, Scott, Murphy & Presser, P.C.; Daniel P. Morris

(57) ABSTRACT

A method of operating a magnetic tape within a tape drive. The tape drive comprises a tape head, which shows a tape-bearing surface meant to face a front side of a magnetic tape, in operation. The tape-bearing surface comprises a transducer area. This area includes at least one transducer, which is a read or write element configured to read or write to the magnetic tape, respectively. The method may include driving the tape (along a longitudinal direction of circulation thereof above the tape-bearing surface) and concomitantly ejecting a gas flow toward the transducer area. The gas flow ejected impinges on the back side of the driven tape (e.g., opposite to the front side of the tape), so as to locally urge the front side of the tape against the transducer area and thereby read or write to the tape via said at least one transducer.

20 Claims, 5 Drawing Sheets

(51) Int. Cl.
*G11B 15/62* (2006.01)
*G11B 15/64* (2006.01)

(56) References Cited

U.S. PATENT DOCUMENTS

| | | | |
|---|---|---|---|
| 3,435,441 A * | 3/1969 | Stahler | F16C 32/06 360/221 |
| 3,678,216 A | 7/1972 | Rousso, Jr. et al. | |
| 3,747,938 A | 7/1973 | Van Der Hilst et al. | |
| 3,979,037 A | 9/1976 | Burdorf | |
| 4,305,536 A | 12/1981 | Burdorf et al. | |
| 4,747,006 A | 5/1988 | Miwa et al. | |
| 4,825,317 A | 4/1989 | Rausch | |
| 5,307,227 A | 4/1994 | Okada et al. | |
| 5,777,823 A | 7/1998 | Gavit | |
| 7,092,191 B2 | 8/2006 | Hashimoto et al. | |
| 8,373,944 B2 | 2/2013 | Biskeborn | |
| 9,230,590 B1 | 1/2016 | Biskeborn et al. | |
| 9,734,849 B2 | 8/2017 | Biskeborn | |
| 10,522,182 B1 * | 12/2019 | Rothuizen | G11B 15/38 |
| 2002/0167758 A1 | 11/2002 | Kennedy et al. | |
| 2005/0152065 A1 | 7/2005 | Hashimoto et al. | |
| 2007/0047142 A1 | 3/2007 | Biskeborn | |
| 2014/0368953 A1 | 12/2014 | Dellmann et al. | |
| 2015/0364154 A1 | 12/2015 | Holmberg et al. | |
| 2016/0055867 A1 | 2/2016 | Engelen et al. | |
| 2016/0196850 A1 | 7/2016 | Biskeborn et al. | |
| 2017/0169841 A1 | 6/2017 | Biskeborn | |
| 2017/0236535 A1 | 8/2017 | Biskeborn et al. | |

FOREIGN PATENT DOCUMENTS

| | | |
|---|---|---|
| JP | 57-205847 A | 12/1982 |
| JP | 6-124510 A | 5/1994 |
| JP | 2016528661 A | 9/2016 |

OTHER PUBLICATIONS

Engelen, J.B., et al., "A Non-Skiving Tape Head with Sub-Ambient Air Pressure Cavities", INTERMAG 2015, May 11-15, 2015, 1 page.

Engelen, J.B., et al., "Flat-Profile Tape-Head Friction and Magnetic Spacing", IEEE Transactions on Magnetics, Mar. 2014, Manuscript revised Sep. 10, 2013, accepted Oct. 2, 2013, date of publication Oct. 11, 2013, date of current version Mar. 14, 2014, 6 pages, vol. 50, No. 3.

Office Action dated May 8, 2019 in parent U.S. Appl. No. 16/105,418, 18 pages.

Notice of Allowance dated Nov. 20, 2019 in parent U.S. Appl. No. 16/105,418, 12 pages.

\* cited by examiner

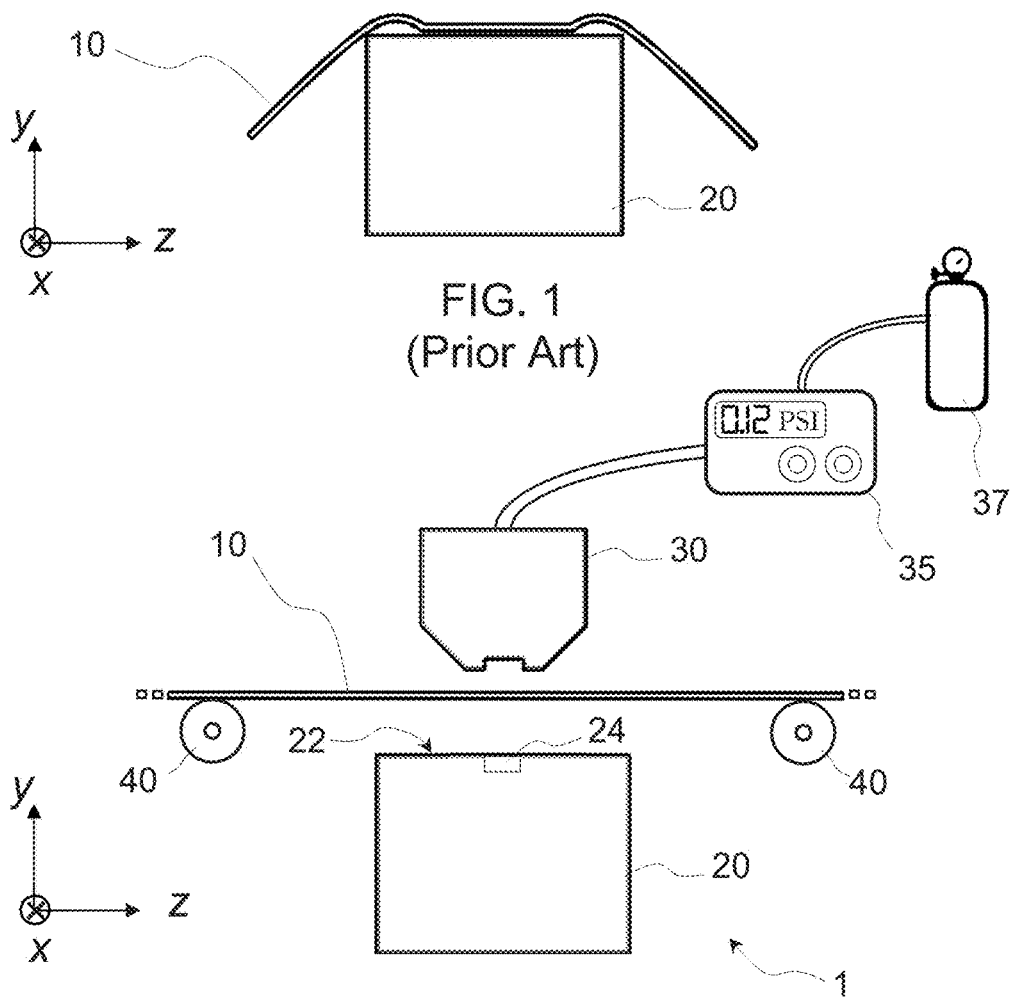
FIG. 1 (Prior Art)
FIG. 2
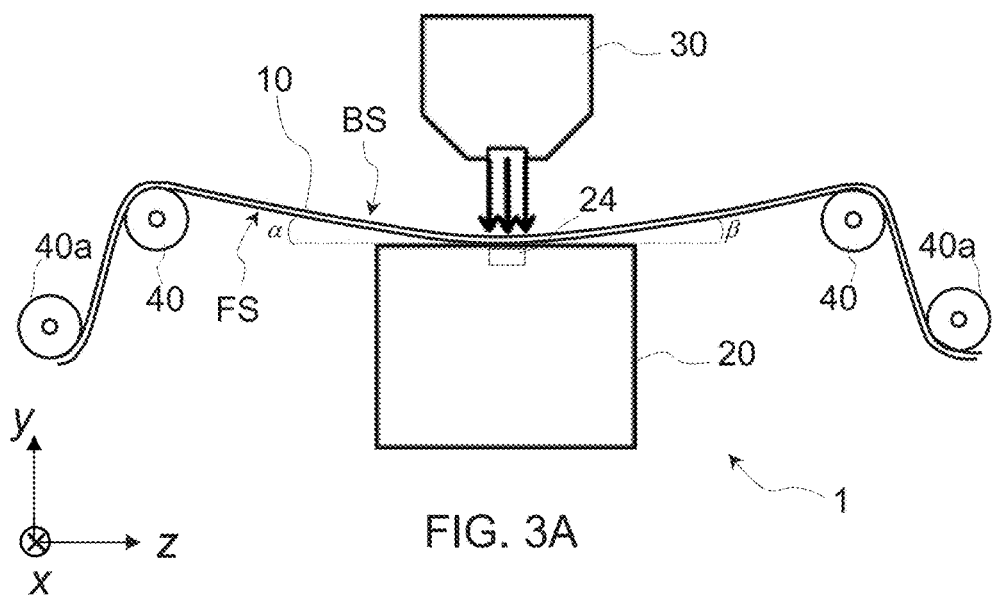
FIG. 3A

TAPE DRIVE WITH GAS JET IMPINGING ON TAPE

BACKGROUND

The present disclosure relates in general to the field of methods of operating magnetic tapes and tape drive systems. In particular, it is directed to systems and methods relying on a gas flow (e.g., air) that impinges on the tape to locally urge it against a tape head transducer area. Related tape drives are also disclosed.

Various data storage media or recording media such as magnetic tape, magnetic disks, optical tape, optical disks, holographic disks or cards are known, which allow for storage and retrieval of data. In magnetic media, data are typically stored as magnetic transitions, i.e., they are magnetically recorded in the magnetic layer of the media. The data stored is usually arranged in data tracks. A typical magnetic storage medium, such as a magnetic tape, usually includes several data tracks. Data tracks may be written and read individually, or sets of data tracks may be written and read in parallel. Transducer (read/write) heads are positioned relative to the data tracks to read/write data along the tracks, at the level of or under the tape-bearing surface of the tape head, in which are embedded magnetic read and write transducers.

To write and read at high areal densities as used by modern tape systems, the magnetic tape has to come in close proximity to the read/write elements on the tape head. To sustain areal density improvement, modern tape systems feature ever decreasing spacing between the head and the magnetic layer-coated side of the tape as the tape is streamed by the head. Research efforts are accordingly spent to achieve viable solutions to reduce the distance between the tape and the head, as reducing this gap is what allows for increasing the areal density. The current technology typically requires a tape-head spacing of several tens of nanometers.

Historically, tapes used to be simply run wrapped over a curved-surface head, causing a layer of stable, compressed air to appear between the two surfaces when streaming the tape, and giving rise to moderate Couette flow shear stress (friction). The thickness of this air bearing is however relatively large, limiting system performance (the air bearing prevents the tape to come in close contact with the head), and is strongly dependent on the tape velocity.

To decrease the spacing and make it less dependent on velocity, various techniques have been developed, which typically rely on engineering the tape head to modify the air flow and local pressure field in the vicinity of the tape-head interface. Such techniques result in an underpressure occurring in the space between the tape and the head relative to the ambient, resulting in a pressure exercised on the section of tape overlapping the head, which pushes this section towards the head surface.

According to the main method in use today, this underpressure is obtained thanks to tape heads with skiving (i.e., sharp) edges, to scrape (or skive) off the air. That is, the underpressure is obtained by skiving the air boundary layer off the tape, which is run at a positive wrap angle over a sharp leading edge of the head, as illustrated in FIG. 1. This results in a low-pressure region directly after the skiving edge, such that the tape is pushed into intimate contact with the tape head, due to the higher air pressure on the opposite side of the tape. An advantage of this solution is that the tape-head spacing is relatively small and stable over a wide range of tape speeds. A disadvantage is the friction (which limits performance) and wear (which limits the operable lifetime of both tape and head) that arise due to the direct contact and the high pressure with which the tape is pushed into contact with the head. Furthermore, the tape is in contact over the whole width (as measure along axis z in FIG. 1) of the head, again causing undesirable friction. In extreme cases, friction can even cause the tape drive motors to stall and tape breakage.

To prevent excessive friction, the tape can be intentionally made rough, i.e. with sporadic bumps on the tape surface so that only a fraction of the tape surface is in actual contact with the tape bearing surface of the head. Effectively, these bumps increase the tape-head spacing. To increase the linear density, one may seek to reduce the tape-head spacing by using a smoother tape. However, using smoother media again results in an increased friction that can degrade the recording and read back performance of the tape drive.

SUMMARY

According to a first aspect, the present invention is embodied as a method of operating a magnetic tape within a tape drive. The tape drive comprises a tape head, which shows a tape-bearing surface meant to face a front side of a magnetic tape, in operation. The tape-bearing surface comprises a transducer area. This area includes at least one transducer, which is a read or write element configured to read or write to the magnetic tape, respectively. The present method in some embodiments includes driving the tape (along a longitudinal direction of circulation thereof above the tape-bearing surface) and concomitantly ejecting a gas flow toward the transducer area. The gas flow ejected impinges on the back side of the driven tape (i.e., opposite to the front side of the tape), so as to locally urge the front side of the tape against the transducer area and thereby read or write to the tape via said at least one transducer.

The present approach makes it possible to force the flexible tape into contact with the tape head only where it is necessary, i.e., at the locations of the magnetic transducers. Thus, no sharp skiving edges or otherwise engineered bearing surfaces are necessary. This can, in turn, be exploited to limit friction and wear of both the tape and the tape head.

In embodiments, the method further comprises positioning the tape for it to form both a lead wrap angle $\alpha$ and a trail wrap angle $\beta$ with respect to a plane subtended by the transducer area while driving the tape and ejecting the gas flow. The tape is positioned and the gas flow ejected so as for one or each of the lead wrap angle $\alpha$ and the trail wrap angle $\beta$ to be between +2.0±0.05 and −4.0±0.05 degrees (or in some embodiments between −0.5±0.05 and −1.5±0.05 degrees). Note, all angle values given in this document are assumed to be defined to an accuracy of ±0.05 degrees.

In some embodiments, the tape is positioned and the gas flow ejected so as for the lead wrap angle $\alpha$ to be negative. Optimizing the wrap angle(s) makes it possible to optimize the contact surface, as present inventors have concluded from various experiments and simulations.

In some embodiments, a flow rate of the gas flow ejected is dynamically adapted according to a characteristic of a contact between the tape and the tape head, a tension of the tape, and/or a speed of the tape as the latter is being driven. This way, an adequate distance may be maintained between the tape and the head, notwithstanding the fact that speed and tension of the tape may typically vary, in operation. Slightly negative wrap angles may, in general, in some embodiments be sought, in order to prevent undesired sticking of the tape. Also, negative wrap angles make it possible to minimize the contact surface between the tape and the transducer area, given the gas flow otherwise applied.

In embodiments, the gas flow is ejected so as for a cross-sectional profile of the ejected gas flow to have a form factor corresponding to a form factor of the transducer area, as measured parallel to a plane subtended by the transducer area. This way, the contact surface can be optimally adjusted to the transducer area.

The gas flow may for instance be ejected perpendicularly to the tape. In some embodiments, the gas flow is ejected at an oblique angle with respect to the tape, so as to transfer some of a momentum of the ejected gas flow to the tape. This, as one may realize, makes it possible to counteract friction, at least in some extent, and further helps in entraining the tape.

According to another aspect, the invention is embodied as a tape drive. Consistently with the above method, the tape drive comprises a tape head, a drive mechanism, and a gas ejection mechanism. The tape head has a tape-bearing surface that is meant to face a front side of a magnetic tape, in operation. The tape-bearing surface comprises a transducer area, comprising at least one transducer that is a read or write element configured to read or write to the magnetic tape, respectively. The drive mechanism is adapted to drive the tape along a longitudinal direction of circulation thereof above the tape-bearing surface. The gas ejection mechanism is configured to eject a gas flow toward the transducer area, for the gas flow to impinge on the back side (opposite to the front side) of the tape as the latter is being driven, so as to locally urge the front side of the tape against the transducer area and thereby read or write to the tape via said at least one transducer, in operation. The gas ejection mechanism is in some embodiments configured as an air knife.

In embodiments, the gas ejection mechanism comprises a nozzle having an aperture for ejecting the gas flow, wherein said aperture advantageously has a form factor corresponding to a form factor of the transducer area. The aperture of the nozzle has an area that is in some embodiments not larger than the transducer area, to optimize the contact surface.

The nozzle may for instance be arranged so as to in some embodiments eject the gas flow perpendicularly to the tape. In some embodiments, however, the nozzle is arranged so as to eject the gas flow at an oblique angle with respect to the tape, so as to transfer some of a momentum of the ejected gas flow to the tape.

The tape head in some embodiments comprises non-skiving edges. For example, the tape-bearing surface of the tape head may have a convex profile along said longitudinal direction of circulation. In that case, the transducer area is located closer to an apex (e.g., right at the apex) of the convex profile than to outer ends thereof along that same direction.

In some embodiments, the tape drive further comprises a tape positioning mechanism adapted to position the tape for it to form both a lead wrap angle α and a trail wrap angle β with respect to a plane subtended by the transducer area while driving the tape and ejecting the gas flow. As a result, the tape typically forms a U-shaped profile above the tape-bearing surface, in operation.

In embodiments, the gas ejection mechanism is configured to eject the gas flow so as for one or each of the lead wrap angle α and the trail wrap angle β to be between +2.0 and −4.0 degrees (and in some embodiments between −0.5 and −1.5 degrees).

In some embodiments, the gas ejection mechanism is further configured to dynamically adapt a flow rate of the gas flow ejected according to one or more of: a characteristic of a contact between the tape and the tape head; a tension of the tape; and a speed of the tape as the latter is being driven by the drive mechanism, in operation.

Methods and apparatuses (or systems) embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIG. 1 is a 2-dimensional cross-sectional view of a tape head with skiving edges, above which a tape is driven, so as to reach an intimate contact with the tape-bearing surface of the head, according to countless, typical prior art solutions;

FIG. 2 is a 2-dimensional cross-sectional view of a tape drive, which involves an air knife, according to embodiments. The tape is shown to be retracted from the tape-bearing surface and the air knife is off;

FIG. 3A is a 2-dimensional cross-sectional view of the tape drive of FIG. 2, illustrating the tape drive in operation, i.e., after turning the air knife on, so as to force a portion of the tape in local contact with the transducer area of the head, as in embodiments. Some of the components of FIG. 2 were omitted for concision;

Figure 3B:
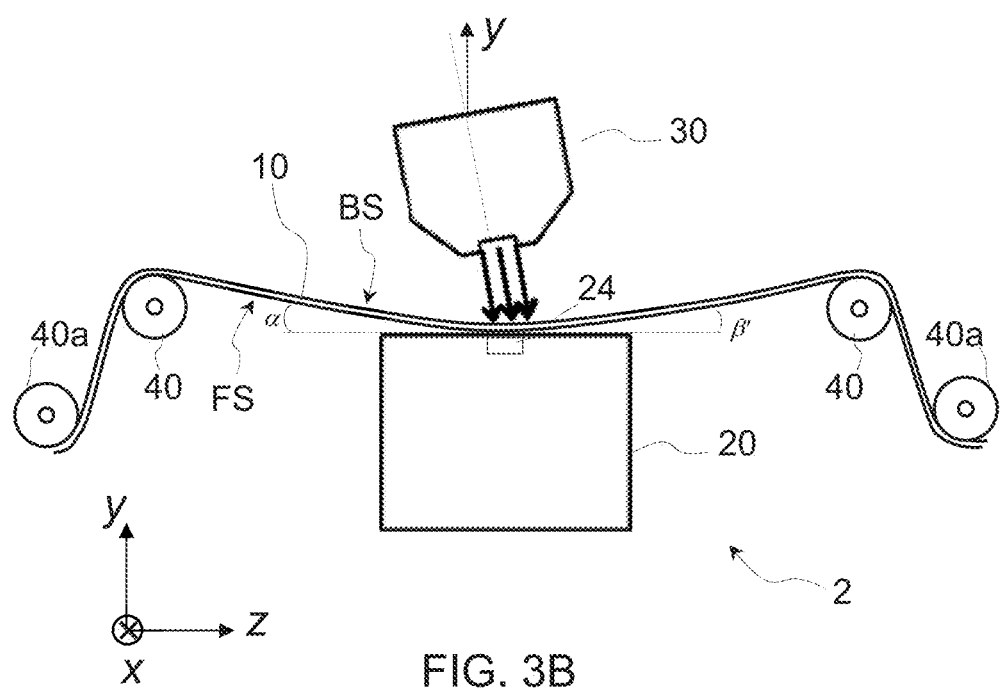
FIG. 3B illustrates a variant to FIGS. 2 and 3A, where the nozzle of the air knife is slanted with respect to the normal of the tape-bearing surface, as in embodiments.

The accompanying drawings show simplified representations of devices or parts thereof, as involved in embodiments. Technical features depicted in the drawings are not to scale, for the sake of depiction and understanding. Similar or functionally similar elements in the figures have been allocated the same numeral references, unless otherwise indicated.

DETAILED DESCRIPTION OF EMBODIMENTS OF THE INVENTION

As noted in the background section, current solutions routinely rely on skiving edges or otherwise engineered tape-bearing surfaces, which result in urging the tape against the whole width of the head and causes undesirable friction. However, and as it may be realized, it is only necessary to have the tape in local contact with the head at the location of the read/write transducers, to ensure optimal performance. The present inventors have accordingly devised a simple solution, which relies on a gas flow impinging on the tape, to force the latter in local contact with the transducer area of the head.

The following description is structured as follows. First, general embodiments and high-level variants are described (sect. 1). The next section addresses more specific embodiments, technical implementation details, as well as simulations and experiments (sect. 2).

1. General Embodiments and High-level Variants

Figure 8:
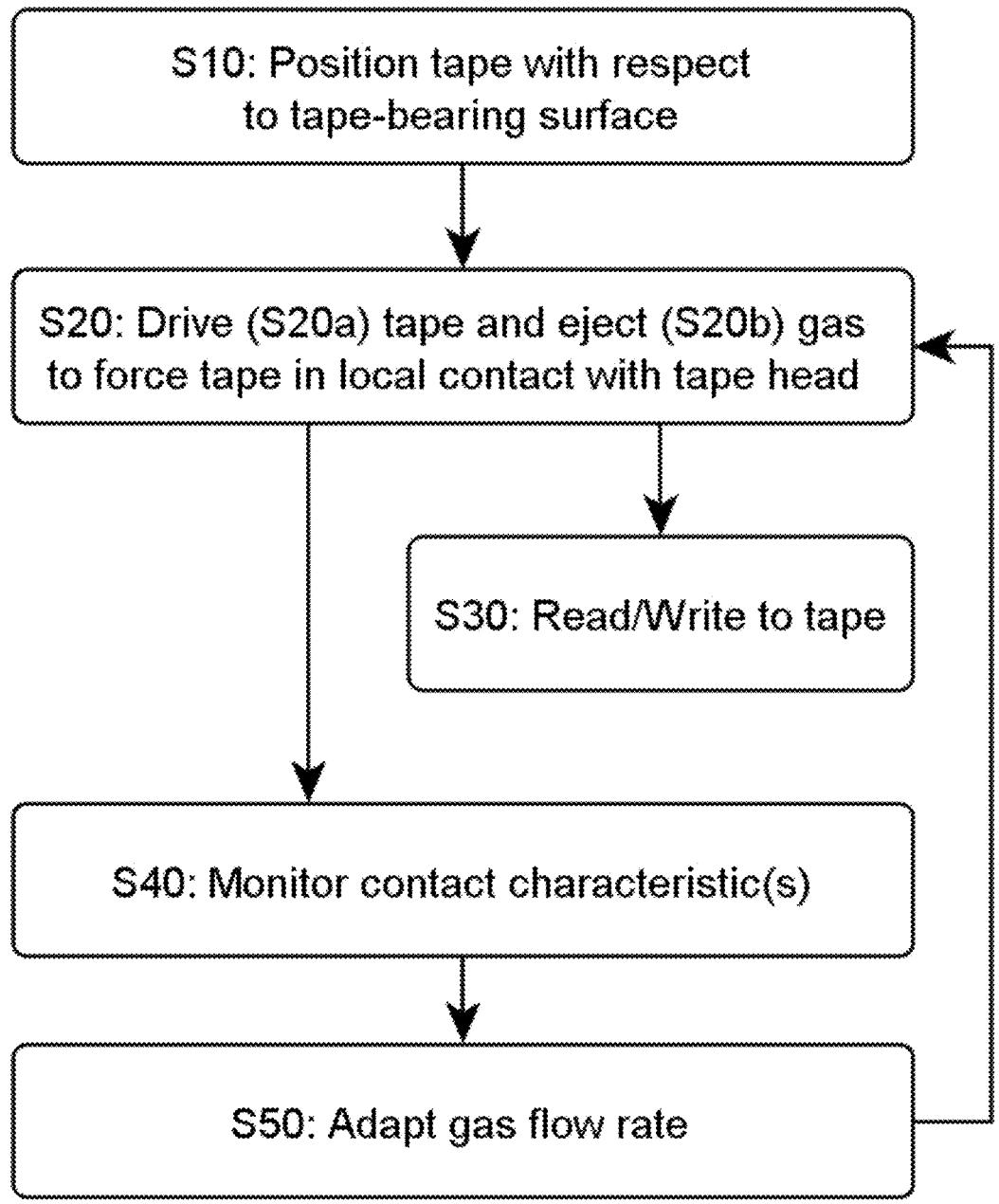
FIG. 8 is a flowchart illustrating high-level steps of a method of operating a tape in a tape drive, according to embodiments.

In reference to FIGS. 2, 3 and 8, an aspect of the invention is first described, which concerns a method S10-S50 of operating a magnetic tape 10 within a tape drive 1, 2, 3.

The tape drive 1-3 notably comprises a tape head 20, 20a-20d. The tape head 20 is generally configured for reading and/or writing to a magnetic tape 10. As usual, this tape head shows a tape-bearing surface 22, 22a-22d (i.e., the surface meant to face the front side FS of the magnetic tape 10, in operation) and the tape-bearing surface comprises a transducer area 24. Depending on the implementation, the area 24 may comprise one or more transducers 25. Typically, several transducers are involved, to read or write tracks in parallel. The head 1 may for instance comprise an array of transducers 25 arranged along the transverse (e.g., cross-track) direction x. In that case, the area 24 will typically have a form factor and extend transversally along the cross-track direction x, i.e., transversally to axis z but parallel to the bearing plane (x, z). As seen in FIG. 3A or 3B, the travel direction (also called along-track direction or direction of circulation) of the tape is in some embodiments parallel to the transducer area 24 and, thus, parallel to axis z at the level of the area 24.

Each transducer 25 is a read or a write element, i.e., an element that is configured to read or write to the magnetic tape 10, respectively, as known per se.

In some embodiments, the present method includes ejecting S20b a gas flow (e.g., air) while driving S20a the tape 10 above the tape-bearing surface 22. That is, steps S20a and S20b are at least partly concomitant, as suggested by the flowchart of FIG. 8.

The gas flow is ejected S20b in the direction of the transducer area 24. Yet, owing to the presence of the tape 10, the gas flow impinges on the backside BS of the tape 10 (i.e., opposite to the front side FS thereof), so as to locally urge the front side FS of the tape 10 against the transducer area 24, in operation. That is, the gas flow bends the tape, which roughly has a U-shaped profile above the tape-bearing surface 22. The lowermost arc of the tape comes in local contact with the transducer area 24, which makes it possible to read or write S30 to the tape 10 via the transducer(s) 25.

Note, the tape head 20 may possibly comprise several arrays of transducers, arranged in distinct areas (not shown). There, a single gas flow or several gas flows (forming distinct vertical flows, distributed along axis z) may be involved, to locally urge the tape 10 against the various transducer areas. Whether to use a single gas flow or distinct flows depends on the dimensions of and gaps between such areas and the dimensions and other characteristics of the ejected gas flows. The ejected gas will typically be air, though other gas such as inert gases may be used in specific contexts (e.g., in clean rooms, or for experimental purposes).

The gas flow (pressure, flow profile) need be adapted to the problem at hand, which can be achieved by trial and error. Now, beyond the pressure and flow geometry required to achieve an optimal tape profile, the ejected gas may further be engineered to exhibit specific physical properties (e.g., in terms of temperature, in order to optimize the bending of the tape and/or minimize damages caused to the tape). In addition, the ejected gas may be slanted, as discussed latter in detail.

As per the above method, the tape is locally urged against the area 24, meaning that a local (stationary) area of the tape is locally forced into closer contact with the tape-bearing surface 22, 22a-22d of the tape head, compared with outer areas of the tape. Said local area compares to a moving window, which is moving with respect to the tape (inversely with the latter as the tape travels above the transducer area) but fixed with respect to the tape head. The local contact area is also characterized by a spacing, or closeness of contact between the tape and the tape head, and a width (measured along axis z) over which this spacing may be considered constant, provided the tape profile locally exhibits a flat bottom.

The present approach makes it possible to force the flexible tape into contact with the tape head 20 only where it is necessary i.e., at the locations of the embedded magnetic transducers 25. Thus, no sharp skiving edges or otherwise engineered structures on the surface 22 are necessary. The tape-bearing surface may thus be made smoother. In turn, no high contact pressure is anymore needed at the edges or other structures (as sometimes provided on or in the surface 22), which limits friction (thus improving performance) and wear (thus improving the operable lifetime) of both the tape 10 and head 20, 20a-20d.

The position and geometry of the tape 10 may otherwise be optimized, as in embodiments discussed now. For instance, referring to FIGS. 2, 3 and 8, the tape 10 may be adequately positioned S10 for it to form specific wrap angles with respect to the tape-bearing surface 22, when operating the tape 10 (while driving S20a the tape 10 and ejecting S20b the gas flow). That is, given an initial position of the tape 10 (e.g., retracted from the surface 22, as in FIG. 2), the gas flow may be adjusted to achieve optimal contact. Conversely, for a given gas flow, the position of the tape 10 may be adjusted S10 to optimize contact. Still, both the initial position of the tape and the gas flow may be jointly optimized.

As explicitly shown in FIGS. 2, 3, the wrap angles include both a lead wrap angle $\alpha$ and a trail wrap angle $\beta$. Such angles are formed by the tape path with respect to the plane delimiting the bearing surface 22, i.e., the plane subtended by the area 24, parallel to (x, z). Note, this plane corresponds the top surface 22 of the head if the latter is flat (as in FIGS. 2, 3 and 5). More precisely, the lead wrap angle $\alpha$ is defined between said delimiting plane and the path the incoming tape 10 takes about the bearing surface 22, owing to the initial positioning S10 of the tape and the ejected gas S20b. The trail wrap angle $\beta$ is similarly defined on the opposite side of the vertical plane (x, y), see FIG. 3. A zero-degree value of the angles $\alpha$ and $\beta$ is defined, with the gas ejection mechanism 30, 35, 37 being off and the plane of tensioned tape being moved gradually from off-contact towards the head, up to a point where the onset of a normal reaction force on the head becomes measurable. Assuming the angle rotation direction convention for tape drives, positive lead and trail wrap angles $\alpha$, $\beta$ ensue when the tape is pushed further into contact with the head, as in FIG. 1, while negative wrap angles $\alpha$, $\beta$ arise when the tape is retracted from the zero-degree position, as in FIGS. 2, 3. The lead wrap angle $\alpha$ and trail wrap angle $\beta$ are commonly referred to (altogether) as wrap angles in the literature.

A number of factors will influence the geometry of the tape about the transducer area 24, including, e.g., the bending stiffness of the tape, the momentum and tension of the tape as it is driven S20a, the pressure of the compressed air bearing on the head side FS of the tape (which depends on the geometry of the tape head), and the pressure exerted S20b by the gas flow impinging on the backside BS of the tape 10. All such parameters can be taken into account into simulations, to find optimal parameters for the initial positioning S10 of the tape and/or the gas flow. Thus, for given tape operating parameters of speed and tension S20a, steps S10 and S20b may be carried out so as to obtain desired wrap angles and, in turn, optimize the contact between the tape and the head. In particular, the tape may initially be positioned S10 and the gas flow ejected S20b in such a manner that one or each of the lead angle $\alpha$ and the trail angle $\beta$ be between +2.0 and −4.0 degrees (using the usual angle rotation direction convention for tape drives, as discussed below). Note, the angles $\alpha$, $\beta$ formed in operation (i.e., as per implementation of steps S10, S20a and S20b) will typically have same signs (be it in a symmetric or slanted configuration, as in FIGS. 3A and 3B, respectively).

Imposing wrap angles in the above range makes it possible to optimize the contact surface, as present inventors have concluded from various experiments and simulations. This is discussed in more detail in sect. 2, in reference to FIGS. 6 and 7. More generally, the angles $\alpha$, $\beta$ may typically be between +5.0 and −10.0 degrees. Some embodiments, however, have angles $\alpha$, $\beta$ between +2.0 and −4.0 degrees or, even better, between −0.5 and −1.5 degrees (for example close to 1.25 degrees), in order to further optimize the contact for width and spacing, as further discussed in section 2.

The usual angle rotation direction convention for tapes is assumed throughout this document. The tape convention differs from the counterclockwise convention used in trigonometry, in that the lead and trail angles are measured counterclockwise and clockwise, respectively, so as to confer the same sign for a symmetric (left-right) profile of the tape, i.e., if the profile of the tape is symmetric with respect to the vertical median plane parallel to (x, y). Thus, the trail angle has the same sign as the lead angle if the tape is always on the same side of the plane delimiting the bearing surface (parallel to (x, z)) and, in particular, when the profile is left-right symmetric. For instance, in the example of FIGS. 3 and 7, both the angle $\alpha$ and $\beta$ are assumed to be negative in the angle rotation direction convention for tape drives, whereas $\beta$ would be negative if measured counterclockwise.

The positioning means 40, 40a are, in the example of FIG. 3, assumed to be positioned so as for the tape 10 to be initially retracted from the top surface 22 of the head (see FIG. 2), while the gas flow impinging S20b on the tape yields negative wrap angles (again, assuming the angle rotation direction convention for tape drives). Slightly negative wrap angles $\alpha$, $\beta$ in some embodiments may, in general, be used, in order to locally confer a U-shape profile to the tape. This not only makes it possible to optimize the contact surface between the tape and the transducer area 24 but also lowers the risk of undesired sticking of the tape to the head (e.g., due to condensation).

Figure 4:
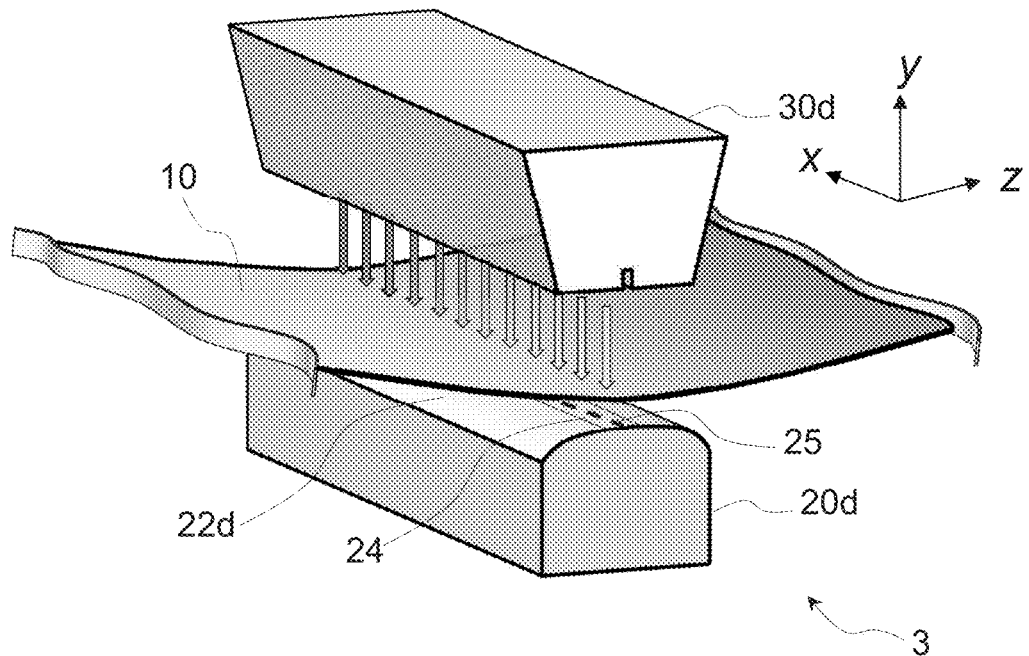
FIG. 4 is a 3-dimensional view of a variant to the tape drive of FIGS. 2 and 3a, involving a convex tape-bearing surface, as in embodiments.

In variants, the present approach may also be implemented using slightly positive wrap angles, contrary to depictions in FIGS. 2-4. Similarly, slightly asymmetric profile can be contemplated. This, however, in some embodiment may be not preferred, inasmuch as a positive wrap angle could cause additional friction and wear, even though the tape head can be shaped convex (as in FIG. 4 or 5A) to mitigate this.

Referring to FIG. 3A, 3B, the gas flow is in some embodiments ejected S20b so as for the ejected gas to have a cross-sectional profile with a form factor corresponding to the form factor of the transducer area 24. Such form factors are appreciated in the plane subtended by the transducer area 24. E.g., as noted earlier, the transducer area 24 may be elongated and extend along the cross-track axis x (especially if it comprises an array of transducer linearly arranged along that direction) and thus exhibit a form factor in the plane (x, z). Therefore, the exhausted fluid flow may be shaped accordingly, see FIGS. 3 and 4, so as to optimize the contact area. This is most simply achieved using a suitably shaped nozzle 30. In variants, several nozzles (not shown) may be relied on, which are arranged linearly and side-by-side along axis x. Note, the latter case should be distinguished from the particular case where an array of nozzles (distributed along axis z) are used for the tape to locally contact distinct arrays of transducers (not shown). Thus, one may more generally have a 1-dimensional or 2-dimensional array of nozzles. Most simple, however, is to rely on a single nozzle for each array of transducers, where each nozzle has a rectangular exhaust shape, as in air knife systems. Yet, the dimension and pressure of exhausted gas need be adapted to the problem at hand, as noted earlier.

Figure 7:
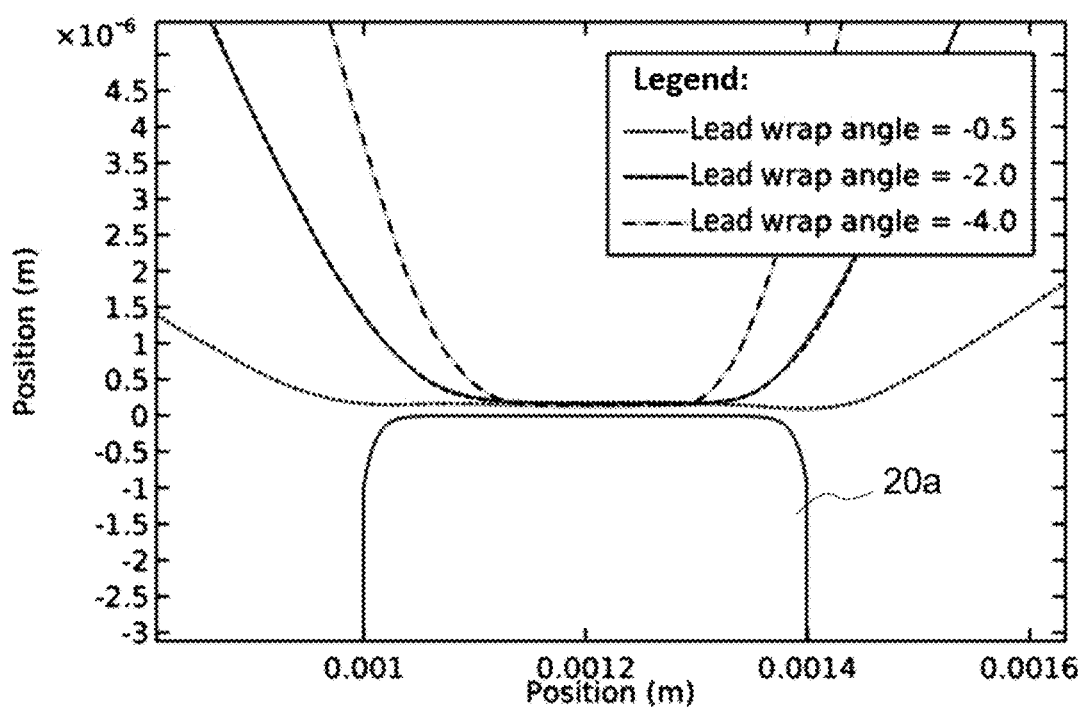
FIG. 7 is a plot representing the tape geometry as the tape is being locally forced into local contact with the head by the air jet, for different values of imposed (symmetric) wrap angles, as obtained by finite element simulation methods.

In embodiments as depicted in FIG. 3A or 7, the gas flow is in some embodiments ejected perpendicularly to the tape 10. In variants, however, the gas flow may be in some embodiments ejected at an oblique angle with respect to the tape 10, so as to transfer some of a momentum of the ejected gas flow to the tape 10. This scenario is illustrated in FIG. 3B, where the nozzle 30 is slanted by ~10 degrees with respect to the vertical axis y. That is, the angle of impingement of the air jet deviates slightly from the normal axis, such that some of the momentum of the air jet is imparted to the tape 10 in its direction of travel. This, as one may realize, makes it possible to counteract friction (from Couette flow shear stress arising in the air bearing between the tape and the head), at least in some extent, and further helps in entraining S20a of the tape.

Referring now to FIG. 8, the flow rate of the gas flow ejected S20b may possibly be dynamically adapted S50, according S40 to the contact spacing between head 20 and tape 10 (or other operational characteristics impacting the contact, such as the tape speed and/or tension) as the tape is being streamed over the head. This may notably be achieved by monitoring S40 the contact spacing. This is useful as the tape speed and tension typically vary, in operation, in ways that can affect the spacing. As the skilled person may appreciate, many methods are known which allow the contact spacing to be monitored S40, such as, e.g., measuring the amplitude of the magnetic readback signal.

In all cases, a pressure source 37 (e.g., a gas bottle or compressor) will typically be relied on, together with a pressure valve 35, combined with a sensor or gauge, so as to be able to control the pressure of exhausted gas. Note, such components are not necessarily integrated in the tape drive but can instead be coupled thereto. For example, the tape drive 1-3 may, a minima, comprise a nozzle 30 or any other similar gas ejection device, comprising a port (e.g., a tubing port), to which a tube, and then a valve and a pressure source can be connected.

Referring to FIGS. 2-5, another aspect of the invention is now described, which concerns a tape drive 1, 2, 3 suited for implementing methods such as described above. Aspects of such tape drives have already been implicitly described in reference to the present methods. They are only briefly described in the following.

In some embodiments, the tape drive 1-3 comprises a tape head 20, 20a-20d, a drive mechanism, and a gas ejection mechanism 30, 35, 37.

In embodiments, aspects of the tape head have already been described: the head has a tape-bearing surface 22, 22a-22d with a transducer area 24, meant to face a front side FS of the magnetic tape 10, while the opposite back side BS faces the gas outlet 30 of the gas ejection mechanism 30, 35, 37, in operation.

The drive mechanism 40 is adapted to drive the tape 10 along its travel direction (parallel to axis z at the level of the area 24). Tape drive mechanisms are known per se; they include reels (not shown) to which tape drive motors (not shown) are coupled, and rollers 40, 40a which guide the tape's streaming path, in particular over the head.

The gas ejection mechanism 30, 35, 37 need be configured to eject a gas flow toward the transducer area 24, for the gas flow to impinge on the back-side BS of the tape 10 as the latter is being entrained S20a, so as to locally urge the front side FS of the tape 10 against the transducer area 24, as described earlier. This, in turn, makes it possible to read and/or write to the tape 10, while minimizing the contact area to the sole useful area, in operation.

In embodiments such as depicted in FIGS. 2-4, the gas ejection mechanism 30, 35, 37 comprises a profiled nozzle 30, 30d. That is, the nozzle 30 has an exhaust aperture with a form factor corresponding to the form factor of the transducer area 24, as discussed earlier. The nozzle's aperture may for instance be rectangular, just like a corresponding transducer area 24, as assumed in the accompanying drawings.

The area of the aperture of the nozzle in some embodiments may preferably not be larger than the transducer area 24. This way, a well delimited gas flow profile (e.g., laterally centered, low-divergence air jet) is ejected, which impinges on the backside of the tape 10, over an area that in some embodiments preferably does not substantially exceed the area 24, so as to effectively restrict the contact to the sole area 24. Note, the dimensions of the area 24 are exaggerated in the accompanying drawings. In reality, this area 24 in some embodiments corresponds to the span of the magnetic transducers.

In FIG. 3A, the nozzle is arranged so as to in some embodiments eject the gas flow perpendicularly to the tape 10: the aperture area and the area 24 are measured in parallel planes, i.e., parallel to the plane subtended by the transducer area 24 and parallel to (x, z). In FIG. 3B, where the nozzle 30 is slanted, the aperture of the nozzle is measured in the exhaust plane (normal to the deviation axis). Yet, its form factor still in some embodiments corresponds to that of the area 24.

Figure 5A:
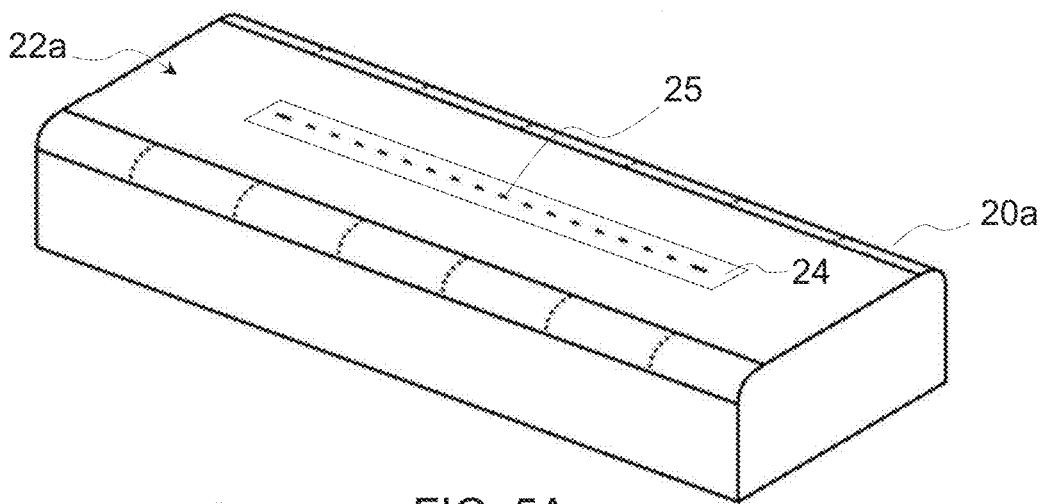
FIGS. 5A-5C depicts possible variants to the geometry of the tape head.
Figure 5B:
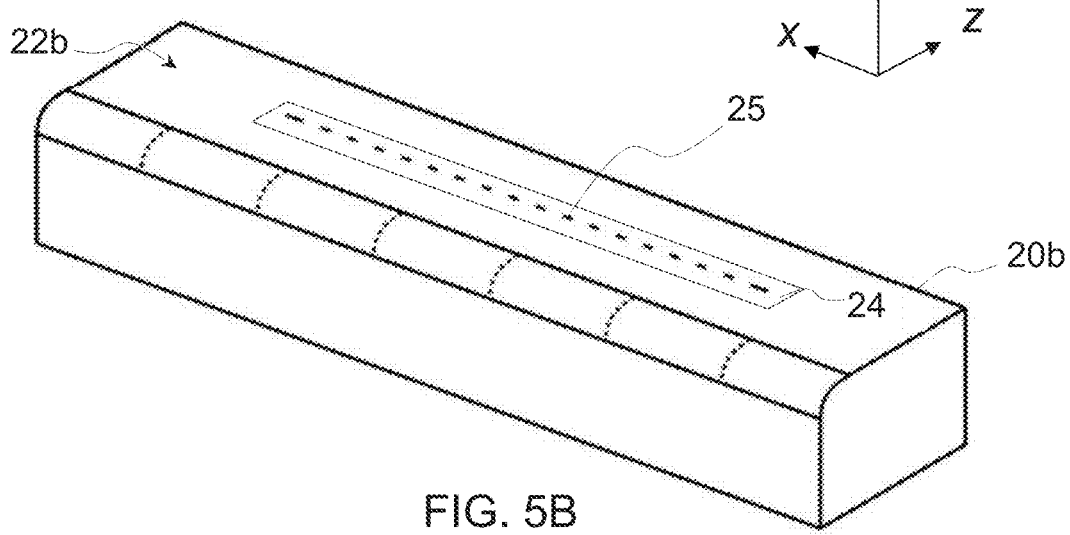
Figure 5C:
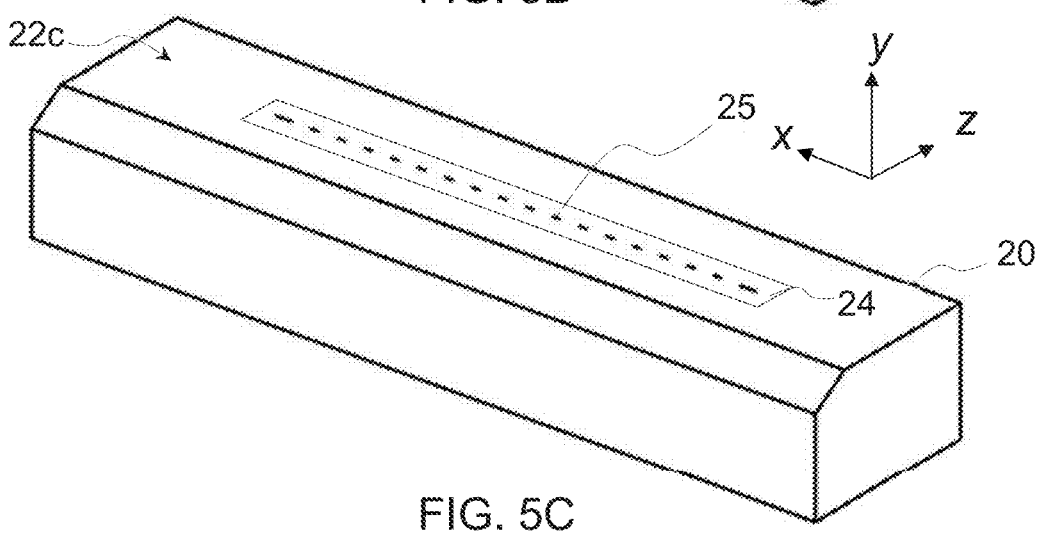

As said, the gas ejection mechanism 30, 35, 37 is in some embodiments configured as an air knife. As the present approach does not require skiving edges (or other structures provided in or on the surface 22) to obtain a close contact, the tape head may be in some embodiments free of skiving edges and, more generally, made smooth on top (no structures, cavities, etc., are provided on top), which simplifies the fabrication of the head. Thus, the present tape heads in some embodiments may comprise non-skiving edges, which may either be rounded or beveled, as illustrated in FIGS. 4-5. Some embodiment may have non-skiving edges on both the leading and trailing side, as illustrated in FIGS. 4 and 5A. Still, an asymmetric tape profile may be required in some cases, such that an asymmetric edge configuration may be contemplated, as assumed in FIGS. 5B and 5C.

In embodiments such as depicted in FIG. 4, the tape-bearing surface 22d of the head 20d of the tape drive 3 has a convex profile along the tape travel direction z. I.e., the profile of the tape-bearing surface 22d appears convex from the viewpoint of the tape 10 or the nozzle 30d. In such a case, the transducer area 24 shall typically be located at the apex of this convex profile or, more precisely, the main (longitudinal) axis of extension of the area 24, which longitudinal axis is parallel to axis x, passes through the line joining apices of the cross-sectional convex profiles of the surface 22d, as formed in planes parallel to (y, z). More generally, slightly asymmetric configuration may be contemplated, whereby the transducer area 24 is located closer to the apex line than to outer ends of the bearing surface 22d.

A convex curvature 22d, such as a cylinder section, with the transducers ideally located at or near the apex line, allows the achievable minimum width of the contact area to be decreased, in cases where the (convex) curvature of the tape is limited by the finite divergence angle of the gas jet or by the bending stiffness of the tape web.

Referring back to FIGS. 2, 3, the present tape drives 1-3 typically comprise tape positioning means 40, 40a. And such means may notably include a tape positioning mechanism 40, 40a, designed so as to adequately position S10 the tape and achieve optimal wrap angles, as discussed earlier. Once the tape is suitably positioned (e.g., retracted from the surface 22, at an intermediate distance between the gas outlet 30 and the bearing surface 22, the tape is entrained S20a and the gas flow ejected S20b locally confers a U-shaped profile to the tape above and at the level of the transducer area 24, in operation. The tape tension may also need be adjusted so as to allow adequate bending of the tape.

Note, the positioning mechanism 40, 40a shall, in practice, typically involve rollers, which can be designed/positioned (and thus guide the tape 10) independently from the tape reels (not shown) that are coupled to tape drive motors (not shown), as usual in the art. Again, the optimal tape position can be jointly devised with the gas flow parameters, which may itself be adapted to the tape speed/tension (or any characteristic of the contact between the tape and the tape head, if suitably monitored). More generally, the position of the tape 10 may be dynamically adjusted, as can also the gas flow characteristics. Also, the positioning of the tape needs to take into account the geometry of the gas ejection mechanism 30. E.g., one may want to slightly retract the tape 10 from the tape head (to obtain a negative lead wrap angle), yet making sure the tape 10 does not collide with the nozzle 30 or other parts of the mechanism 30, 35, 37.

The above embodiments have been succinctly described in reference to the accompanying drawings and may accommodate a number of variants. Several combinations of the above features may be contemplated. Examples are given in the next section.

2. Specific Embodiments—Technical Implementation Details

In the particular embodiments discussed here, a specific air bearing configuration (FIG. 2) is relied on, in conjunction with a jet of air impinging against the backside BS of the tape 10, in order to force the latter locally into contact with the head (FIG. 3). The jet has a form factor, having its longest dimensions in the cross-track direction x to cover the lateral span of the array of transducers (~3 mm long). The air jet has shorter dimensions in the along-track direction z, so as to localize the pressure imprint to the region 24 of the head surface corresponding to the along-track span of the transducers (typically as small as ~10 μm). To generate the air jet, a nozzle configuration 30 is used, which compares to nozzles of air knives such as used in industrial settings to blow-dry or cool products during manufacturing. In the present context, however, the nozzle and air jet are scaled to obtain the required jet dimensions and properties.

Figure 6:
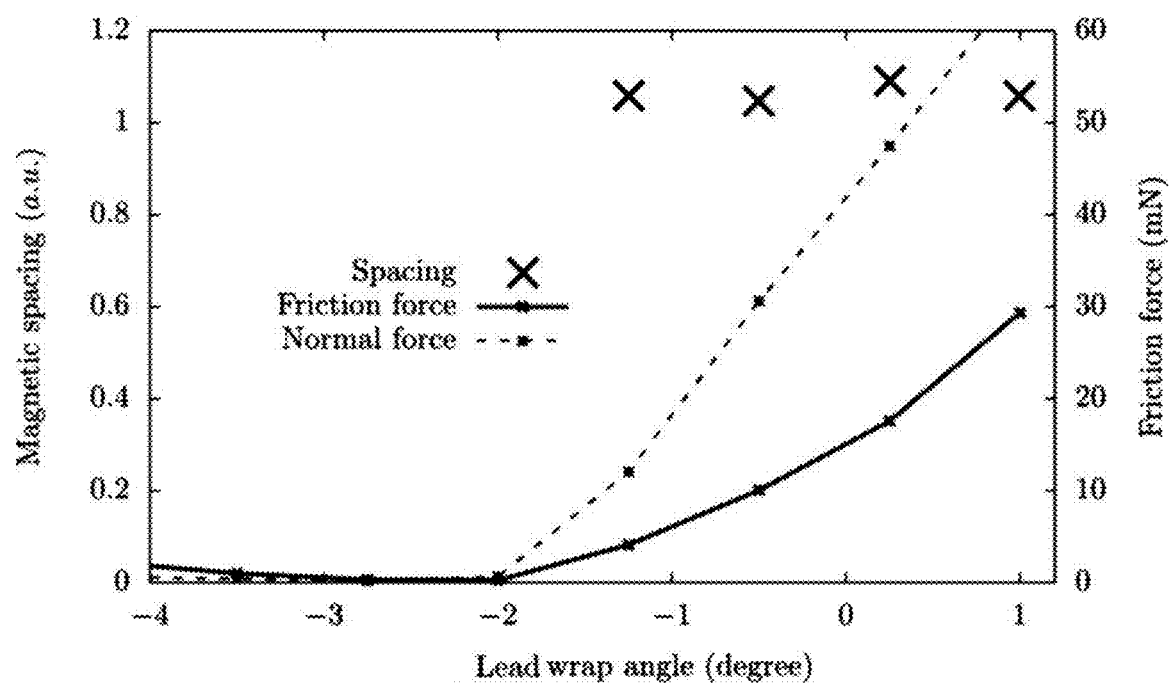
FIG. 6 is a plot representing the normal (reaction) and friction forces according to the lead/trail wrap angles formed between the tape and the tape head, as obtained according to experiments and measurements performed by the Inventors.

FIG. 6 shows the result of an experiment, in which a commercial air knife was used to bring the tape into local contact with a tape head. The head is a typical commercial tape write head, whose air-skiving function was disabled by beveling the sharp outer edges, such that the tape does not come into (too) close contact with the head at any normal operating wrap angle.

More precisely, FIG. 6 shows experimental results in terms of friction and normal forces, as obtained with the air knife jet on (as shown in FIG. 3A), with the tape initially positioned well off contact, i.e., at a large negative lead wrap angle (as in FIG. 2), and the lead wrap angle was gradually increased. The wrap geometry in this experiment was symmetric, i.e. the trailing wrap angle was kept equal in magnitude and with the same sign as the leading wrap angle (in accordance with the angle convention for tape drives). As seen in FIG. 6, the air flow from the air knife was not sufficient to push the tape into measurable contact for leading wrap angles substantially more negative than −1.25 degrees. At a lead wrap angle of about −1.25 degrees, an onset of friction and normal force was detected. In addition, magnetic particulate noise could be detected using servo readers of the write head, indicating that the spacing is small enough to read back a magnetic signal. However, quantitative estimates of the magnetic spacing (based on the shape of the measured noise) could not be obtained in this case because of the low cutoff frequency of the servo channel analog front-end, whence the arbitrary units in the plot.

As the lead wrap angle was increased (i.e., became less negative), by repositioning S10 the tape, an increase of friction as well as normal force was observed, as expected due to the fact that the region of contact widens, which, in turn, increases such forces proportionally. Also, above the critical lead wrap angle of −1.25 degree, the estimate of the magnetic spacing remains approximately constant, indicating a robust contact between the head and tape at the position of the servo read elements.

FIG. 7 shows results from finite element simulations, wherein the steady-state shape of the moving tape web was computed as results from the equilibrium between the bending stiffness of the tape, momentum of the tape, pressure of the compressed air bearing on the head side of the tape, and pressure from a laterally centered, low-diverging air jet (not shown) that impinges on the back side of the tape. The head surface is denoted by a black line, while the dotted and (long) dashed lines indicate the position of the tape for different imposed values of the (symmetric) wrap angle. The inventors have observed that by varying the wrap angle the contact region changes size, demonstrating that by acting on the geometry it is possible to adjust the width of the contact region to—or towards—an optimal small value.

One understands that an optimal wrap angle may be achieved. More generally, by performing tests on and simulating various experimental settings, the present Inventors came to the conclusion that an optimal contact should be obtained for wrap angles in the range of +2.0 to −4.0 degrees and, in particular, in the range of −0.5 to −1.5 degrees. Still, owing to the variety of tape drive designs, other wrap angle values may possibly be contemplated.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A tape drive, comprising:
a tape head having a tape-bearing surface meant to face a front side of a magnetic tape, in operation, the front side opposite to a back side of the tape, wherein the tape-bearing surface comprises a transducer area, the transducer area comprising at least one transducer that is a read or write element configured to read or write to the magnetic tape, respectively;
a drive mechanism adapted to drive the tape along a longitudinal direction of circulation thereof above the tape-bearing surface; and
a gas ejection mechanism, configured to eject a gas flow toward the transducer area, for the gas flow to impinge on the back side of the tape as the tape is being driven, so as to locally urge the front side of the tape against the transducer area and thereby read or write to the tape via said at least one transducer, in operation,
wherein the tape drive further comprises a tape positioning mechanism adapted to position the tape for it to form both a lead wrap angle α and a trail wrap angle β with respect to a plane subtended by the transducer area while driving the tape and ejecting the gas flow, the tape forming an upright U-shaped profile above the tape-bearing surface and below the gas ejection mechanism, in operation.

2. The tape drive of claim 1, wherein the gas ejection mechanism comprises a nozzle having an aperture for ejecting the gas flow, wherein said aperture has a form factor corresponding to a form factor of the transducer area.

3. The tape drive of claim 2, wherein the aperture of the nozzle has an area that is not larger than the transducer area.

4. The tape drive of claim 2, wherein the nozzle is arranged so as to eject the gas flow perpendicularly to the tape.

5. The tape drive of claim 2, wherein the nozzle is arranged so as to eject the gas flow at an oblique angle with respect to the tape, so as to transfer some of a momentum of the ejected gas flow to the tape.

6. The tape drive of claim 1, wherein the gas ejection mechanism is configured as an air knife.

7. The tape drive of claim 1, wherein the tape head comprises non-skiving edges.

8. The tape drive of claim 7, wherein the tape-bearing surface of the tape head has a convex profile along said longitudinal direction of circulation, and the transducer area is located closer to an apex of the convex profile than to outer ends thereof along that same direction.

9. The tape drive of claim 1, wherein the gas ejection mechanism is configured to eject the gas flow so as for one or each of the lead wrap angle α and the trail wrap angle β to be between +2.0 and −4.0 degrees.

10. The tape drive of claim 1, wherein the tape positioning mechanism and the gas ejection mechanism are adapted to position the tape and eject the gas flow so as for one or each of the lead wrap angle α and the trail wrap angle β to be between −0.5 and −1.5 degrees.

11. The tape drive of claim 1, wherein the gas ejection mechanism is further configured to adapt a flow rate of the gas flow ejected according to at least one of: a characteristic of a contact between the tape and the tape head; a tension of the tape; and a speed of the tape as the latter is being driven by the drive mechanism, in operation.

12. A method of operating a magnetic tape within a tape drive, the tape drive comprising a tape head having a tape-bearing surface meant to face a front side of a magnetic tape, in operation, the front side opposite to a back side of the tape, wherein the tape-bearing surface comprises a transducer area, the transducer area comprising at least one transducer that is a read or write element configured to read or write to the magnetic tape, respectively, and wherein the method comprises:

driving the tape along a longitudinal direction of circulation thereof above the tape-bearing surface; and ejecting a gas flow toward the transducer area, for the gas flow to impinge on the back side of the driven tape, so as to locally urge the front side of the tape against the transducer area and thereby read or write to the tape via said at least one transducer, wherein the tape drive is adapted to position the tape for the tape to form both a lead wrap angle α and a trail wrap angle β with respect to a plane subtended by the transducer area while driving the tape and ejecting the gas flow, the tape forming an upright U-shaped profile above the tape-bearing surface and below the gas ejection mechanism, in operation.

13. The method of claim 12, wherein the tape is positioned and the gas flow ejected so as for one or each of the lead wrap angle α and the trail wrap angle β to be between +2.0 and −4.0 degrees.

14. The method of claim 13, wherein the tape is positioned and the gas flow ejected so as for one or each of the lead wrap angle α and the trail wrap angle α to be between −0.5 and −1.5 degrees.

15. The method of claim 14, wherein the tape is positioned and the gas flow ejected so as for the lead wrap angle α to be negative.

16. The method of claim 12, wherein the method further comprises:

adapting a flow rate of the gas flow ejected according to at least one: a characteristic of a contact between the tape and the tape head; a tension of the tape; and a speed of the tape as the latter is being driven.

17. The method of claim 12, wherein the gas flow is ejected so as for a cross-sectional profile of the ejected gas flow to have a form factor corresponding to a form factor of the transducer area, as measured parallel to a plane subtended by the transducer area.

18. The method of claim 12, wherein the gas flow is ejected perpendicularly to the tape.

19. The method of claim 12, wherein the gas flow is ejected at an oblique angle with respect to the tape, so as to transfer some of a momentum of the ejected gas flow to the tape.

20. A tape drive comprising:

a tape head having a tape-bearing surface, wherein the tape-bearing surface comprises a transducer area, the transducer area comprising at least one transducer;

a drive mechanism adapted to drive the tape along a longitudinal direction of circulation thereof above the tape-bearing surface;

a gas ejection mechanism, configured to eject a gas flow toward the transducer area, for the gas flow to impinge on a magnetic tape as the magnetic tape is being driven, so as to locally urge a side of the magnetic tape against the transducer area; and a tape positioning mechanism adapted to position the tape for the tape to form both a lead wrap angle α and a trail wrap angle β with respect to a plane subtended by the transducer area while driving the tape and ejecting the gas flow, the tape forming an upright U-shaped profile above the tape-bearing surface and below the gas ejection mechanism, in operation.

* * * * *